US012448608B2

(12) United States Patent
Tang et al.

(10) Patent No.: US 12,448,608 B2
(45) Date of Patent: Oct. 21, 2025

(54) RECOMBINANT BACTERIA FOR PRODUCING DE-EPOXIDIZED EPOTHILONE B AND USE THEREOF

(71) Applicants: Beijing Biostar Pharmaceuticals Co., Ltd., Beijing (CN); Chengdu Biostar Pharmaceuticals, LTD., Chengdu (CN)

(72) Inventors: Li Tang, Beijing (CN); Rongguo Qiu, Beijing (CN)

(73) Assignees: Beijing Biostar Pharmaceuticals Co., Ltd., Beijing (CN); Chengdu Biostar Pharmaceuticals, LTD., Chengdu (CN)

( * ) Notice: Subject to any disclaimer, the term of this patent is extended or adjusted under 35 U.S.C. 154(b) by 660 days.

(21) Appl. No.: 17/758,042

(22) PCT Filed: Jul. 23, 2021

(86) PCT No.: PCT/CN2021/108266
§ 371 (c)(1),
(2) Date: Jun. 27, 2022

(87) PCT Pub. No.: WO2022/017523
PCT Pub. Date: Jan. 27, 2022

(65) Prior Publication Data

US 2023/0340550 A1 Oct. 26, 2023

(30) Foreign Application Priority Data

Jul. 24, 2020 (CN) ......................... 202010725297.3

(51) Int. Cl.
*C12N 9/02* (2006.01)
*C12N 15/74* (2006.01)
*C12P 11/00* (2006.01)
*C12P 17/16* (2006.01)

(52) U.S. Cl.
CPC ........... *C12N 9/0071* (2013.01); *C12N 15/74* (2013.01); *C12P 17/167* (2013.01)

(58) Field of Classification Search
CPC ............................ C12N 9/0071; C12P 17/167
See application file for complete search history.

(56) References Cited

U.S. PATENT DOCUMENTS 6,303,342 B1 * 10/2001 Julien .................. C07D 417/06 435/76
6,998,256 B2 2/2006 Arslanian
7,067,286 B2 6/2006 Julien et al.
7,138,279 B2 11/2006 Julien
7,402,421 B2 * 7/2008 Julien .................. C07D 513/08 435/252.35
7,732,186 B2 * 6/2010 Julien .................. C07D 493/08 435/252.35
2002/0137152 A1 9/2002 Santi et al.
2004/0224414 A1 11/2004 Julien

FOREIGN PATENT DOCUMENTS

| | | | |
|---|---|---|---|
| CN | 1333820 | A | 1/2002 |
| CN | 1629283 | A | 6/2005 |
| CN | 101323869 | A | 12/2008 |
| CN | 101851591 | A | 10/2010 |
| CN | 104805149 | A | 7/2015 |
| CN | 110628802 | A | 12/2019 |
| EP | 1320611 | B1 | 11/2005 |
| WO | 0208440 | A2 | 1/2002 |
| WO | 03072730 | A2 | 9/2003 |

OTHER PUBLICATIONS

Japanese Office Action issued on Oct. 10, 2023 for Japanese Patent Application No. 2022-537248 (3 pages).
Ogura H, et al. Epok, a cytochrome P450 involved in biosynthesis of the anticancer agents epothilones A and B. Substrate-mediated rescue of a P450 enzyme. Biochemistry. Nov. 23, 2004;43(46):14712-21.
Frykman, S. A. et al., "Control of Secondary Metabolite Congener Distributions via Modulation of the Dissolved Oxygen Tension," Biotechnol. Prog. (2002); 18(5): pp. 913-920.
Tang, L. et al., "Cloning and Heterologous Expression of the Epothilone Gene Cluster," Science (2000); 287: pp. 640-642.
Chinese Office Action issued on Sep. 5, 2023 for Chinese Patent Application No. 202010725297.3 (7 pages).
Extended European Search Report issued on Sep. 8, 2023 for European Patent Application No. 21845599.6 (9 pages).
Japanese Office Action issued on Jun. 20, 2023 for Japanese Patent Application No. 2022-537248 (3 pages).
Kern et al., "Highly Efficient CYP167A1 (EpoK) dependent Epothilone B Formation and Production of 7-Ketone Epothilone D as a New Epothilone Derivative," Scientific Reports (2015); 5: 1-13.
International Search Report issued on Oct. 29, 2021 for International Patent Application No. PCT/CN2021/108266 (8 pages).
Reeves et al., "Genetic Engineering to Produce Polyketide Analogues," 2009, Methods in Enzymology, vol. 459, pp. 295-318, DOI: 10.1016/S0076-6879 (09) 04613-8.
Xia et al., "Improving conjugation efficacy of Sorangium cellulosum by the addition of dual selection antibiotics," copyright 2008, Jul. 16, 2008, J. Ind. Microbiotechnol, vol. 35, pp. 1157-1163, DOI 10.1007/s10295-008-0395-9.
Tang et al., "Generation of New Epothilones by Genetic Engineering of a Polyketide Synthase in Myxococcus xanthus," 2005, J. Antibiot., vol. 58, No. 3, pp. 178-184.

* cited by examiner

*Primary Examiner* — Yong D Pak
(74) *Attorney, Agent, or Firm* — Fox Rothschild LLP

(57) ABSTRACT

Recombinant *Sorangium cellulosum* for producing de-epoxidized epothilone B by fermentation, insertional inactivation of an epoK gene in an epothilone biosynthetic gene cluster in the recombinant bacteria, and a method for producing de-epoxidized epothilone B using the recombinant bacteria.

12 Claims, 7 Drawing Sheets

Specification includes a Sequence Listing.

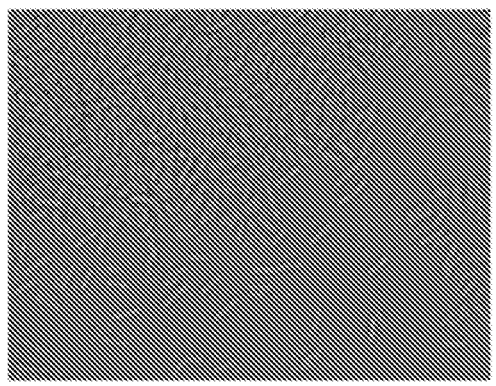
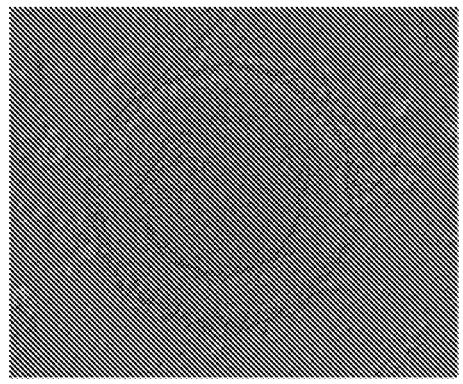
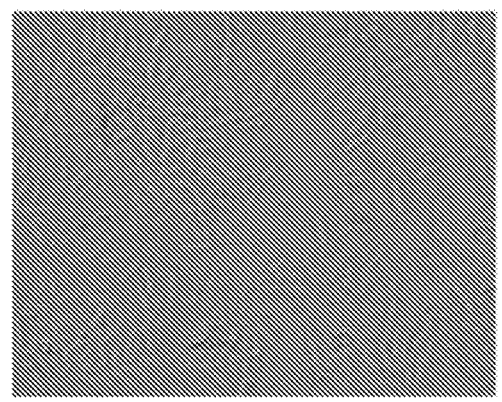
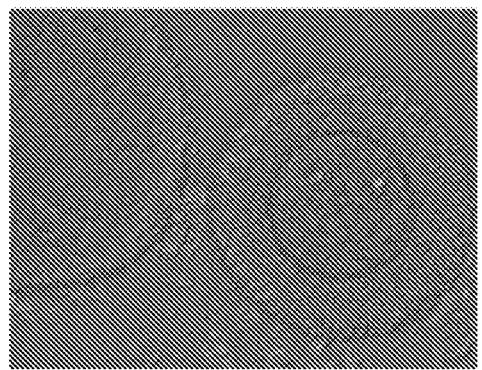
FIG.2B

*AGCCGTTCGCGCCTGGGTACGCGGAGGACCCGTTCCCCGCGATCGA*
*GCGCCTGAGAGAGGCAACCCCCATCTTCTACTGGGATGAAGGCCGCTCCT*
*GGGTCCTCACCCGATACCACGACGTGTCGGCGGTGTTCCGCGACGAACGC*
*TTCGCGGTCAGTCGAGAAGAGTGGGAATCGAGCGCGGAGTACTCGTCGGC*
*CATTCCCGAGCTCAGCGATATGAAGAAGTACGGATTGTTCGGGCTGCCGCC*
*GGAGGATCACGCTCGGGTCCGCAAGCTCGTCAACCCGTCGTTT*ACAGGT
TGGCTGATAAGTCCCCGGTCTGGATCGATCCCCGTGACCTCAGGCGGA
AAACGGGAAGACACACTCATGAGATGCCTGCAAGCAATTCGTTCTGTA
TCAGGCGCAGGAGCGTCCCGTCCGGGTCGACCAAAGCGGCCATCGTGC
CTCCCCACTCCTGCAGTTCGGGGGCATGGATGCGCGGATAGCCGCTGCT
GGTTTCCTGGATGCCGACGGATTTGCACTGCCGGTAGAACTCCGCGAG
GTCGTCCAGCCTCAGGCAGCAGCTGAACCAACTCGCGAGGGGATCGA
GCCCGGGGTGGGCGAAGAACTCCAGCATGAGATCCCCGCGCTGGAGGA
TCATCCAGCCGGCGTCCCGGAAAACGATTCCGAAGCCCAACCTTTCATA
GAAGGCGGCGGTGGAATCGAAATCTCGTGATGGCAGGTTGGGCGTCGC
TTGGTCGGTCATTTCGAACCCCAGAGTCCCGCTCAGAAGAACTCGTCA
AGAAGGCGATAGAAGGCGATGCGCTGCGAATCGGGAGCGGCGATACCG
TAAAGCACGAGGAAGCGGTCAGCCCATTCGCCGCCAAGCTCTTCAGCA
ATATCACGGGTAGCCAACGCTATGTCCTGATAGCGGTCCGCCACACCCA
GCCGGCCACAGTCGATGAATCCAGAAAGCGGCCATTTTCCACCATGAT
ATTCGGCAAGCAGGCATCGCCATGGGTCACGACGAGATCCTCGCCGTC
GGGCATGCGCGCCTTGAGCCTGGCGAACAGTTCGGCTGGCGCGAGCCC
CTGATGCTCTTCGTCCAGATCATCCTGATCGACAAGACCGGCTTCCATC
CGAGTACGTGCTCGCTCGATGCGATGTTTCGCTTGGTGGTCGAATGGGC
AGGTAGCCGGATCAAGCGTATGCAGCCGCCGCATTGCATCAGCCATGAT
GGATACTTTCTCGGCAGGAGCAAGGTGAGATGACAGGAGATCCTGCCC
CGGCACTTCGCCCAATAGCAGCCAGTCCCTTCCCGCTTCAGTGACAAC
GTCGAGCACAGCTGCGCAAGGAACGCCCGTCGTGGCCAGCCACGATA
GCCGCGCTGCCTCGTCCTGCAGTTCATTCAGGGCACCGGACAGGTCGG

FIG.3

```
TCTTGACAAAAAGAACCGGGCGCCCTGCGCTGACAGCCGGAACACG
GCGGCATCAGAGCAGCCGATTGTCTGTTGTGCCCAGTCATAGCCGAATA
GCCTCTCCACCCAAGCGGCCGGAGAACCTGCGTGCAATCCATCTTGTTC
AATCATGCGAAACGATCCTCATCCTGTCTCTTGATCAGATCTTGATCCCC
TGCGCCATCAGATCCTTGGCGGCAAGAAAGCCATCCAGTTTACTTTGCA
GGGCTTCCCAACCTTACCAGAGGGCGCCCAGCTGGCAATTCCGGTTC
GCTTGCTGTCCATAAAACCGCCCAGTCTAGCTATCGCCATGTAAGCCCA
CTGCAAGCTACCTGCTTTCTCTTTGCGCTTGCGTTTTCCCTTGTCCAGAT
AGCCCAGTAGCTGACATTCATCCGGGGTCAGCACCGTTTCTGCGGACT
GGCTTTCTACGTGTTCCGCTTCCTTTAGCAGCCCTTGCGCCCTGAGTGC
TTGCGGCAGCGTGAAGCTGGGCTGCAGGAATTGATCCAGACCGGGGAC
TTATCAGCCAACCTGTT*ACGTCACGCGCCATCGACCTGCTGCGCGCCGAA
ATACAGCGCACCGTCGACCAGCTGCTCGATGCTCGCTCCGGACAAGAGGA
GTTCGACGTTGTGCGGGATTACGCGGAGGGAATCCCGATGCGCGCGATCA
GCGCTCTGTTGAAGGTTCCGGCCGAGTGTGACGAGAAGTTCCGTCGCTTC
GGCTCGGCGACTGCGCGCGCTCGGCGTGGGTTTGGTGCCCCAGGTCG
ATGAGGAGACCAAGACCCTGGTCGCGTCCGTCACCGAGGGGCTCGCGCT
GCTCCATGACGTCCTCGATGAGCGGCGCAGGAACCCGCTCGAAAATGACG
TCTTGACGATGCTGCTTCAGGCCGAGGCCGACGGCAGCAGGCTGAGCACG
AAGGAGCTGGTCGCGCTCGTGGGTGCGATTATCGCTGCTGGCACCGATAC
CACGATCTACCTTATCGCGTTCGCTGTGCTCAACCTGCTGCGGTCGCCCGA
GGCGCTCGAGCTGGTGAAGGCCGAGCCCGGGCTCATGAGGAACGCGCTC
GATGAGGTGCTCCGCTTCGACAATATCCTCAGAATAGGAACTGTGCGTTTCG
CCAGGCAGGACCTGGAGTACTGCGGGGCATCGATCAAGAAGGGGAGATG
GTCTTTCTCCTGATCCCGAGCGCCCTGAGAGATGGGACTGTATTCTCCAGG
CCAGACGTGTTTGATGTGCGACGGGACACGGGCGCGAGCCTCGCGTACG
GTAGAG*
```

FIG.3(continue)

SEQUENCE LISTING

<160> NUMBER OF SEQ ID NOS: 17

<210> SEQ ID NO 1
<211> LENGTH: 2699
<212> TYPE: DNA
<213> ORGANISM: Artificial
<220> FEATURE:
<223> OTHER INFORMATION: Inactivated EpoK fragment

<400> SEQUENCE: 1

```
agccgttcgc gcctgggtac gcggaggacc cgttccccgc gatcgagcgc ctgagagagg      60 caaccccccat cttctactgg gatgaaggcc gctcctgggt cctcacccga taccacgacg     120
tgtcggcggt gttccgcgac gaacgcttcg cggtcagtca agaagagtgg gaatcgagcg     180
cggagtactc gtcggccatt cccgagctca gcgatatgaa gaagtacgga ttgttcgggc     240
tgccgccgga ggatcacgct cgggtccgca agctcgtcaa cccgtcgttt aacaggttgg     300
ctgataagtc cccggtctgg atcgatcccc cgtgacctca ggcggaaaac gggaagacac     360
actcatgaga tgcctgcaag caattcgttc tgtatcaggc gcaggagcgt cccgtccggg     420
tcgaccaaag cggccatcgt gcctccccac tcctgcagtt cggggggcatg gatgcgcgga     480 tagccgctgc tggtttcctg gatgccgacg gatttgcact gccggtagaa ctccgcgagg     540
tcgtccagcc tcaggcagca gctgaaccaa ctcgcgaggg gatcgagccc ggggtgggcg     600
aagaactcca gcatgagatc cccgcgctgg aggatcatcc agccggcgtc ccggaaaacg     660
attccgaagc ccaacctttc atagaaggcg gcggtggaat cgaaatctcg tgatggcagg     720
ttgggcgtcg cttggtcggt catttcgaac cccagagtcc cgctcagaag aactcgtcaa     780
gaaggcgata gaaggcgatg cgctgcgaat cgggagcggc gataccgtaa agcacgagga     840
agcggtcagc ccattcgccg ccaagctctt cagcaatatc acgggtagcc aacgctatgt     900
cctgatagcg gtccgccaca cccagccggc cacagtcgat gaatccagaa aagcggccat     960
tttccaccat gatattcggc aagcaggcat cgccatgggt cacgacgaga tcctcgccgt    1020
cgggcatgcg cgccttgagc ctggcgaaca gttcggctgg cgcgagcccc tgatgctctt    1080
cgtccagatc atcctgatcg acaagaccgg cttccatccg agtacgtgct cgctcgatgc    1140
gatgtttcgc ttggtggtcg aatgggcagg tagccggatc aagcgtatgc agccgccgca    1200
ttgcatcagc catgatggat actttctcgg caggagcaag gtgagatgac aggagatcct    1260
gccccggcac ttcgcccaat agcagccagt cccttcccgc ttcagtgaca acgtcgagca    1320
cagctgcgca aggaacgccc gtcgtggcca gccacgatag ccgcgctgcc tcgtcctgca    1380
gttcattcag ggcaccggac aggtcggtct tgacaaaaag aaccgggcgc ccctgcgctg    1440
acagccggaa cacggcggca tcagagcagc cgattgtctg ttgtgcccag tcatagccga    1500
```

```
atagcctctc cacccaagcg gccggagaac ctgcgtgcaa tccatcttgt tcaatcatgc   1560
gaaacgatcc tcatcctgtc tcttgatcag atcttgatcc cctgcgccat cagatccttg   1620
gcggcaagaa agccatccag tttactttgc agggcttccc aaccttacca gagggcgccc   1680
cagctggcaa ttccggttcg cttgctgtcc ataaaaccgc ccagtctagc tatcgccatg   1740
taagcccact gcaagctacc tgctttctct ttgcgcttgc gttttccctt gtccagatag   1800
cccagtagct gacattcatc cggggtcagc accgtttctg cggactggct ttctacgtgt   1860
tccgcttcct ttagcagccc ttgcgcctg agtgcttgcg gcagcgtgaa gctgggctgc    1920
aggaattgat ccagaccggg gacttatcag ccaacctgtt acgtcacgcg ccatcgacct   1980
gctgcgcgcc gaaatacagc gcaccgtcga ccagctgctc gatgctcgct ccggacaaga   2040
ggagttcgac gttgtgcggg attacgcgga gggaatcccg atgcgcgcga tcagcgctct   2100
gttgaaggtt ccggccgagt gtgacgagaa gttccgtcgc ttcggctcgg cgactgcgcg   2160
cgcgctcggc gtgggtttgg tgccccaggt cgatgaggag accaagaccc tggtcgcgtc   2220
cgtcaccgag gggctcgcgc tgctccatga cgtcctcgat gagcggcgca ggaacccgct   2280
cgaaaatgac gtcttgacga tgctgcttca ggccgaggcc gacggcagca ggctgagcac   2340
gaaggagctg gtcgcgctcg tgggtgcgat tatcgctgct ggcaccgata ccacgatcta   2400
ccttatcgcg ttcgctgtgc tcaacctgct gcggtcgccc gaggcgctcg agctggtgaa   2460
ggccgagccc gggctcatga ggaacgcgct cgatgaggtg ctccgcttcg acaatatcct   2520
cagaatagga actgtgcgtt tcgccaggca ggacctggag tactgcgggg catcgatcaa   2580
gaaaggggag atggtctttc tcctgatccc gagcgccctg agagatggga ctgtattctc   2640
caggccagac gtgtttgatg tgcgacggga cacgggcgcg agcctcgcgt acggtagag   2699
```

```
<210> SEQ ID NO 2
<211> LENGTH: 26
<212> TYPE: DNA
<213> ORGANISM: Artificial
<220> FEATURE:
<223> OTHER INFORMATION: Primer QK-F

<400> SEQUENCE: 2
gcaagcttca ggatctacaa tctcgc                                         26

<210> SEQ ID NO 3
<211> LENGTH: 27
<212> TYPE: DNA
<213> ORGANISM: Artificial
<220> FEATURE:
<223> OTHER INFORMATION: Primer QK-R

<400> SEQUENCE: 3
cgtctagatt aaacgacggg ttgacga                                        27

<210> SEQ ID NO 4
<211> LENGTH: 31
<212> TYPE: DNA
<213> ORGANISM: Artificial
<220> FEATURE:
<223> OTHER INFORMATION: Primer HK-F

<400> SEQUENCE: 4
cgtctagagt atacgtcacg cgccatcgac c                                   31

<210> SEQ ID NO 5
<211> LENGTH: 27
```

```
<212> TYPE: DNA
<213> ORGANISM: Artificial
<220> FEATURE:
<223> OTHER INFORMATION: Primer HK-R

<400> SEQUENCE: 5
cgggatccgg agaaagacca tctcccc                                          27

<210> SEQ ID NO 6
<211> LENGTH: 32
<212> TYPE: DNA
<213> ORGANISM: Artificial
<220> FEATURE:
<223> OTHER INFORMATION: Primer BG-K1

<400> SEQUENCE: 6
atcatatgac acaggagcaa gcgaatcaga gt                                    32

<210> SEQ ID NO 7
<211> LENGTH: 23
<212> TYPE: DNA
<213> ORGANISM: Artificial
<220> FEATURE:
<223> OTHER INFORMATION: Primer BK-R

<400> SEQUENCE: 7
gagttctacc ggcagtgcaa atc                                              23

<210> SEQ ID NO 8
<211> LENGTH: 31
<212> TYPE: DNA
<213> ORGANISM: Artificial
<220> FEATURE:
<223> OTHER INFORMATION: Primer BG-K2

<400> SEQUENCE: 8
cgcctcgagg cgagcaaggg acaccccggg g                                     31

<210> SEQ ID NO 9
<211> LENGTH: 20
<212> TYPE: DNA
<213> ORGANISM: Artificial
<220> FEATURE:
<223> OTHER INFORMATION: Primer 27F

<400> SEQUENCE: 9
agagtttgat cctggctcag                                                  20

<210> SEQ ID NO 10
<211> LENGTH: 20
<212> TYPE: DNA
<213> ORGANISM: Artificial
<220> FEATURE:
<223> OTHER INFORMATION: Primer 1495R

<400> SEQUENCE: 10
ctacggctac cttgttacga                                                  20

<210> SEQ ID NO 11
<211> LENGTH: 1451
<212> TYPE: DNA
<213> ORGANISM: Sorangium cellulosum
<220> FEATURE:
<223> OTHER INFORMATION: 16SrRNA

<400> SEQUENCE: 11
```

| | |
|---|---|
| cggcgcgctt aacacatgca agtcgagcga gaaagggctt cggccccggt aaagcggcgc | 60 |
| acgggtgagt aacacgtagg taatctgccc ccaggtggtg gataacgttc cgaaaggagc | 120 |
| gctaatacag catgagacca cgtcttcgaa agaggatgag gtcaaagccg gcctcttcac | 180 |
| gaaagctggc gccaggggat gagcctgcgg cccatcagct agttggtagg gtaatggcct | 240 |
| accaaggcga agacgggtag ctggtctgag aggatgatca gccacactgg aactgagaca | 300 |
| cggtccagac tcctacggga ggcagcagtg gggaatcttg cgcaatgggc gaaagcctga | 360 |
| cgcagcgacg ccgcgtgagt gatgaaggcc ttcgggttgt aaagctctgt ggaggggggac | 420 |
| gaataagggt tggctaacat ccagctcgat gacggtaccc cttagcaag caccggctaa | 480 |
| ctctgtgcca gcagccgcgg taagacagag ggtgcaaacg ttgttcggaa ttactgggcg | 540 |
| taaagcgcgt gtaggcggtt cgtaaagtca gatgtgaaag ccctgggctt aacccaggaa | 600 |
| gtgcacttga aactcacgaa cttgagtccc ggagaggaag gcggaattct cggtgtagag | 660 |
| gtgaaattcg tagatatcga gaggaacatc ggtggcgaag gcggccttct ggacggtgac | 720 |
| tgacgctgag acgcgaaagc gtggggagca aacaggatta gataccctgg tagtccacgc | 780 |
| cgtaaacgat gggtgctagg tgtcgcgggc tttgactcct gcggtgccgt agctaacgca | 840 |
| ttaagcaccc cgcctgggga gtacggccgc aaggctaaaa ctcaaaggaa ttgacggggg | 900 |
| cccgcacaag cggtggagca tgtggttcaa ttcgacgcaa cgcgcagaac cttacctggg | 960 |
| ctagaaaatg caggaacctg gttgaaagat cggggtgctc ttcggagaac ctgtagttag | 1020 |
| gtgctgcatg gctgtcgtca gctcgtgtcg tgagatgttg ggttaagtcc cgcaacgagc | 1080 |
| gcaacccta tcgttagttg ccagcggttc ggccgggcac tctagcgaga ctgccgatat | 1140 |
| ttaaatcgga ggaaggtggg gatgacgtca agtcctcatg gcccttatgt ccagggctac | 1200 |
| acacgtgcta caatgggcgg tacagacggt cgcgaacccg cgaggggaag ccaatccgaa | 1260 |
| aaaaccgtcc tcagtacgga taagagtctg caactcgact cttgaagt ggaatcgcta | 1320 |
| gtaatccctg atcagcaggc aggggtgaat acgttcccgg gccttgtaca caccgcccgt | 1380 |
| cacaccatgg gagtcgattg ctccagaagt ggctgcgcca acccgcaagg gaggcaggcc | 1440 |
| cccaaggagt g | 1451 |

<210> SEQ ID NO 12
<211> LENGTH: 20
<212> TYPE: DNA
<213> ORGANISM: Artificial
<220> FEATURE:
<223> OTHER INFORMATION: Primer MTW-F

<400> SEQUENCE: 12
gctgctcacc acgccggaat                                              20

<210> SEQ ID NO 13
<211> LENGTH: 19
<212> TYPE: DNA
<213> ORGANISM: Artificial
<220> FEATURE:
<223> OTHER INFORMATION: Primer MTW-R

<400> SEQUENCE: 13
tcagcggagc catcggccc                                               19

<210> SEQ ID NO 14
<211> LENGTH: 1213
<212> TYPE: DNA
<213> ORGANISM: Sorangium cellulosum

```
<220> FEATURE:
<223> OTHER INFORMATION: Methyltransferase MT domain

<400> SEQUENCE: 14
tcggaggcgg ctgacggatc tccacgaacc ggatctcccg cggtccaggg ctccggtgaa      60
tcaagcggtg agtgacacct ggctgtggga cgccgcgctg gacggtggac ggcgccagag     120
cgcgagcgtg cccgtcgacc tggtgctcgg cagcttccat gcgaagtggg aggtcatgga     180
gcgcctcgcg caggcgtaca tcatcggcac tctccgcata tggaacgtct tctgcgctgc     240
tggagagcgt cacacgatag acgagttgct cgtcaggctt caaatctctg tcgtctacag     300
gaaggtcatc aagcgatgga tggaacacct tgtcgcgatc ggcatccttg taggggacgg     360
agagcatttt gtgagctctc agccgctgcc ggagcctgat ttggcggcgg tgctcgagga     420
ggccgggagg gtgttcgccg acctcccagt cctatttgag tggtgcaagt ttgccgggga     480
acggctcgcg gacgtattga ccggtaagac gctcgcgctc gagatcctct tccctggtgg     540
ctcgttcgat atggcggagc gaatctatcg agattcgccc atcgccgtt actcgaacgg      600
catcgtgcgc ggtgtcgtcg agtcggcggc gcggtggta gcaccgtcgg gaatgttcag      660
catcttggag atcggagcag ggacgggcgc gaccaccgcc gccgtcctcc cggtgttgct     720
gcctgaccgg acggagtacc atttcaccga tgtttctccg ctcttccttg ctcgcgcgga     780
gcaaagattt cgagattatc cattcctgaa gtatggcatt ctggatgtcg accaggagcc     840
agctggccag ggatacgcac atcagaggtt tgacgtcatc gtcgcggcca atgtcatcca     900
tgcgacccgc gatataagag ccacggcgaa gcgtctcctg tcgttgctcg cgcccggagg     960
ccttctggtg ctggtcgagg gcacagggca tccgatctgg ttcgatatca ccacgggatt    1020
gattgagggg tggcagaagt acgaagatga tcttcgtatc gaccatccgc tcctgcctgc    1080
tcggacctgg tgtgacgtcc tgcgccgggt aggctttgcg gacgccgtga gtctgccagg    1140
cgacggatct ccggcgggga tcctcggaca gcacgtgatc ctctcgcgcg cgccgggcat    1200
agcaggagcc gct                                                       1213

<210> SEQ ID NO 15
<211> LENGTH: 16
<212> TYPE: DNA
<213> ORGANISM: Artificial
<220> FEATURE:
<223> OTHER INFORMATION: Primer GAPDH-F

<400> SEQUENCE: 15
tcgtgctcga gtgcac                                                     16

<210> SEQ ID NO 16
<211> LENGTH: 16
<212> TYPE: DNA
<213> ORGANISM: Artificial
<220> FEATURE:
<223> OTHER INFORMATION: Primer GAPDH-R

<400> SEQUENCE: 16
agaagcccca ctcgtt                                                     16

<210> SEQ ID NO 17
<211> LENGTH: 693
<212> TYPE: DNA
<213> ORGANISM: Sorangium cellulosum
<220> FEATURE:
<223> OTHER INFORMATION: GAPDH sequence
```

-continued

```
<400> SEQUENCE: 17
agaagcccca ctcgttgtcg taccacgaga agatcttcgc gaagcggtcg ccgaggaccg     60
acgtcatggt ggcgtcgaac gtgctggagg ccggcgagcc gatgaagtcg cccgagacga    120
gctcccggtc ggtgtagtcg aggatgtcct tcatcggacc ctgctcggcg gcctgcttca    180
tcgcggcgtt gatgctgtcc ttcgtgatcg gcttctcggt ctcgagggtg aggtccacga    240
gcgagacgtc gaccgtgggg acgcggatcg cgagcccgtc gaacttgccc ttgagcgacg    300
ggatgacctc ggacagcgcc ttcgcggcgc cggtgctcga ggggatcatg ttgaccgcgg    360
cggcgcgcgc gcggcgcagg tcgcccttcc ggtgcgggat gtcgagcagg tgctggtcgt    420
tcgtgtacga gtgcaccgtc gtcatcaggc cgcggacgat gccgaagttg tcgagcatca    480
ccttggcgat gggggcgagg cagttcgtcg tgcaggagcc gcacgagatg atcgtgtgct    540
tctgcgcgtc gtagagctcg tcgttcacgc ccatgacgac cgtgaggtcg tggcccttgg    600
cgggcgcgct gatgatcacg cgcttggcgc cggcgttcag gtggccggcg gccttcgcct    660
tgtccgtgaa gaggcccgtg cactcgagca cga                                 693
```

RECOMBINANT BACTERIA FOR PRODUCING DE-EPOXIDIZED EPOTHILONE B AND USE THEREOF

CROSS REFERENCE TO RELATED APPLICATIONS

This application is the U.S. national phase of International Patent Application No. PCT/CN2021/108266, filed on Jul. 23, 2021, which claims priority to Chinese Patent Application No. 202010725297.3, filed on Jul. 24, 2020, the disclosures of which are incorporated herein by reference in their entirety.

TECHNICAL FIELD

The present application relates to recombinant bacterial strain and use thereof, more specifically, to a recombinant strain of *Sorangium cellulosum* for producing de-epoxidized epothilone B and use thereof.

BACKGROUND

Epothilones, produced by soil microorganisms, are macrolides antibiotics with anti-tumor activity that act on tubulin. They were firstly isolated from *Sorangium cellulosum* in the early 1990s as mainly two epothilone products, namely epothilone A and B with structures shown below.

Epothilone A: R = H; Epothilone B: R = CH$_3$

Cloning and analysis of genes in the epothilone biosynthetic gene cluster of *Sorangium cellulosum* has shown that, de-epoxidized epothilone A and B are produced as secondary metabolites in a ratio of 2:1 by polymerizing acyl-CoA with nitepothilone polyketide synthases. These two microbial secondary metabolites are finally converted to epoxidized epothilone A and B, respectively, by cytochrome P450 oxidase produced by epoK. *Sorangium cellulosum*, as naturally occurring bacteria, only produce trace amounts of de-epoxidized epothilone A and B, greatly lower than the amounts of the final products epothilone A and B; and at least 35 other epothilone analogs are also produced during the fermentation of *Sorangium cellulosum* (Hardt, et al., J Nat Prod 64: 847-856, 2001). The Danishefsky research group in the United States successfully synthesized de-epoxidized epothilone B via a chemical process, however this synthesis process is complicated, hard-to-control, low-yield and also costly, thereby greatly reducing its pharmaceutical development potential.

Since de-epoxidized epothilone B in the non-epoxidized form is far less toxic than the epoxidized counterpart of epothilone, there is need to develop a bacterial strain with efficiency in the production of de-epoxidized epothilone B, in order to increase the yield of de-epoxidized epothilone B for clinical therapy.

U.S. Pat. Nos. 5,843,718 and 6,033,883 describe the production of novel polyketides using the recombinant modular PKS gene in the recombinant host cells, such as *Streptomyces, E coli* or Myxobacteria, as well as recombinant methods by introducing heterologous PKS genes into said host cells. Epothilones A and B were reported to produce by introducing heterologous epothilone genes in host cells that cannot produce epothilones, such as *Streptomyces coelicolor* and *Myxococcus xanthus* (Tang, et al. Science 287:640-642; Julien & Shah, 2002, Amtimicrobial. Agent Chemother. 46(9): 2772-2778).

SUMMARY OF INVENTION

In the first aspect, provided herein is a recombinant strain of *Sorangium cellulosum* for producing de-epoxidized epothilone B via fermentation, in which an epoK gene in an epothilone biosynthesis gene cluster is inactivated.

In some embodiments, the epoK gene is inactivated by mutation, insertion, deletion and/or substitution.

In some embodiments, the recombinant strain is derived from *Sorangium cellulosum* So ce90.

In some embodiments, the epoK gene is inactivated by insertion, so that the epoK gene comprises a nucleotide sequence of SEQ ID NO. 1, and the insertion sequence is from position 291 to position 1960 of SEQ ID NO. 1. More particularly, the recombinant strain is *Sorangium cellulosum* BG03-09K.

The recombinant strain provided herein has a modification in the epothilone biosynthesis gene epoK, by inserting a DNA fragment into the gene in the epothilone biosynthesis gene cluster through DNA recombination to inactivate said gene.

The recombinant strain provided herein may be obtained using a recombination method via homologous recombination. In said method, two adjacent regions from a gene or genes to be modified due to involving epothilone biosynthesis or a functional segment thereof are cloned into a suicide vector to obtain an conjugative transfer vector, a double-cross recombination is occurred between the sequences cloned in the suicide vector and their homologous sequences in the gene(s) in the host cell, and then said gene(s) or functional segment(s) thereof is(are) inactivated due to insertion or replacement, producing a genetically engineered recombinant strain. For example, one or two antibiotic-resistance genes may be connected at both ends with two regions of the gene to be changed, and the corresponding wild-type gene in a host cell may be replaced by said antibiotic-resistance gene via a DNA recombination in the host cell between the homologous sequences in the wild-type epoK gene and on both sides of the antibiotic-resistance gene(s), generating a loss-of-function recombinant strain due to insertion of the antibiotic resistance gene(s). Such inactivation may also be achieved by random or point mutation, deletion or substitution of a gene. The resulting recombinant gene(s) involved in biosynthesis is (are) different from the corresponding one(s) in the natural-occurring strain, so that epothilone derivatives or intermediate products may be produced as main products in the recombinant strain. For example, for a host cell containing an epothilone synthetic gene, epothilone B may be produced as main product. When a different DNA sequence is inserted into the DNA sequence of the epoK gene (an epothilone biosynthesis gene) to cause inactivation, the resulting recombinant strain may produce de-epoxidized epothilone B as a main product.

The recombinant bacterial strain obtained herein, such as BG03-09K, can still have good stability after a long time of storage. For example, 30-50 ml of BG03-09K cultured in BCF medium for 3±1 days is mixed with 10-20 ml of 90/6-100% sterile glycerol in a sterile bottle, and 1-1.5 ml aliquot of the mixture is then added into a labeled sterile cell-cryopreservation tube as a stock of the production strain, which is immediately placed at ultra-low temperature below −70° C. for cryopreservation. The stock strain maintains good stability of a long period.

For the genetic identification of the recombinant *Sorangium cellulosum* strain BG03-09K, PCR amplification and gene sequencing have been done for the housekeeping gene (glyceraldehyde 3-phosphate dehydrogenase (GAPDH) gene), 16S rRNA gene, and an EpoD-MT functional region. Three pairs of oligo primers are designed for PCR amplification, and the resulting PCR products are sequenced and analyzed. Based on the comparison of gene sequences of BG03-09K with the database, it is found that the DNA sequences of BG03-09K and the corresponding sequences of *S. cellulosum* have few differences in the evolutionary distance at nucleotide level with each other, demonstrating that BG03-09K is a strain of the species *S. cellulosum*.

In the second aspect, provided herein is a method for producing de-epoxidized epothilone B, comprising culturing the recombinant strain of *Sorangium cellulosum* according to the first aspect in a medium.

In some embodiments, the medium used in the production method is a water-soluble medium, for example, BCF medium for seed culture, which contains 0.8-1.0% soy peptone, 0.5-0.7% fructose, 0.05%-0.1% $MgSO_4 \cdot 7H_2O$ and 25-50 mM HEPES, pH 7.2-7.6; and FBCF medium for fermentation production, which contains 0.6-0.7% soy peptone, 0.5-0.7% fructose, 0.05-0.1% $MgSO_4 \cdot 7H_2O$ and 5-10 mg/L trace element solution, pH 7.1±0.3.

In some embodiments, the production method comprises adding XAD-16 resin, for example 2%-5% XAD-16 resin, into the fermentation production medium for fermentation.

In some embodiments, fed-batch is performed daily during the fermentation of the production method.

In some embodiments, the production method further comprises purifying de-epoxidized epothilone B with a PC chromatography column and a C chromatography column, and in the purification, a solution of 62-80% methanol, such as 62%, 67% %, 72%, 77% or 80% methanol is used for elution.

Particularly, the detailed procedure of de-epoxidized epothilone B production using the high-yield de-epoxidized epothilone B-producing strain BG03-09K may be as follows:

1) The stock bacteria contained in the cryopreservation tube stored at ultra-low temperature refrigerator below −70° C. are cultured for a specified time, followed by transferring to the seed medium for culture. Next, the seed cultures whose growing features meet the requirements are aseptically transferred to the fermentation medium in a fermentation tank at an inoculation ratio of 5±1%. Then, the fed-batch culture according to the following process parameters is carried out for 14±2 days.

2) Parameters for the fermentation culture procedure: the culture temperature is set to 34° C., with an acceptable range of 34±1° C.; the pH is set to 7.1, with an acceptable range of 7.1±0.3, adjusted with an acid and base solution; the dissolved oxygen control point is set to 30%-50%, controlled by air inflow volume and stirring speed, and antifoaming agent is used. The fed-batch is performed 2±1 times per day during the fermentation, starting from the afternoon on day 3±1, using a soy peptone solution and a fructose solution.

3) From day 6 of fermentation to its end, samples are taken daily for measuring contents and determining the growth state and the purity of bacteria under the microscope. The fermentation yield is calculated following the HPLC detection using XAD resin and a methanol elution solution (see FIG. 1). The fermentation yield will be ≥240 mg/L and may be as high as 500 mg/L or more.

Preferably, in the method, the seed culture condition and fermentation culture condition used in the method may be 34° C., with an acceptable range of 34±1° C.

Preferably, in the method, the fermentation culture condition used in the method is set to pH 7.1, with an acceptable range of pH 7.1±0.3.

Preferably, in the method, the fed-batch is started at day 3±1 of fermentation for 2±1 times per day, and the soy peptone solution and the fructose solution are added.

Preferably, in the method, the fermentation culture time is extended to 14 days±2 days by batched injection for a higher yield.

When the fermentation is completed, the bacterial cells/bacterial culture is separated from XAD resin with a 100-200 mesh sieve, the separated XAD is washed with an equal amount of water and then loaded onto XAD resin column, and the XAD resin is eluted with >90% methanol to collect the methanol elution containing the product as the XAD eluate.

The XAD eluate is passed through an absorbent cotton filter, and water is added to prepare a sample solution with a methanol concentration of about 50%±5% (v/v), which is then loaded onto a PC chromatographic column (C18 packing). 62-80% methanol solution is used for elution and product collection.

The collected fractions that meet the standards from the above PC column treatment are added with purified water to prepare a sample solution with a methanol concentration of about 50%±5 (v/v), which is then loaded onto a C chromatographic column (C18 packing). A 62-80% methanol solution is used for elution and product collection. The HPLC purity of de-epoxidized epothilone B in the collected fractions that meet the standards from C column treatment reaches 98%, and the peak area of other individual impurities should not be greater than 1.0%. The total recovery yield after the PC column and C chromatographic column treatments is greater than 70%.

In the method, the HPLC purity of de-epoxidized epothilone B in the collected fractions that meet the standards from the C-column treatment reaches 98%, and the peak area of other individual impurities is no more than 1.0%.

B shows the comparison of cell morphology under microscope of the BG03-09K strains before and after passages which are cultured for 3-6 days. The two panels on the left are fresh samples cultured for 3 days; the two panels on the right are samples after 6 days of culture.

FIG. 3 shows SEQ ID NO. 1, the DNA sequence of epoK gene with an inactivation region due to the insertion, in which the epoK gene sequence is in italic, and the inserted DNA sequence is in normal font.

FIG. 4. A shows the HPLC profile of the XAD eluate after fermentation, B shows the HPLC analysis profile after the C chromatographic column treatment. The HPLC purity of de-epoxidized epothilone B in the collected fractions from the BG03-09K strain reaches 98%, and the peak area of other individual impurities is no more than 1.0%.

Figure 5:
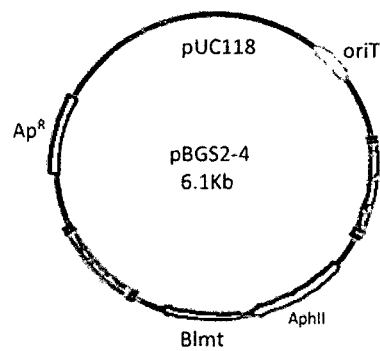

FIG. 5 shows the conjugative transfer plasmid (pBGS2-4).

EMBODIMENTS

Example 1. Construction of a Genetically Engineered Strain with EpoK Gene Inactivation This example describes a genetically engineered strain with EpoK gene inactivation due to the insertion and its construction.

Total DNA contents were obtained from the wild-type bacteria of *Sorangium cellulosum* So ce90, a natural epothilone-producing strain, using a DNA extraction kit (Jiangsu Kangwei Century Biotechnology Co., Ltd.), as described in Jaona et al., 1992, Plasmid 28:157-165. Two adjacent regions of the EpoK gene in the epothilone biosynthesis gene cluster were cloned by PCR with the following primers: QK-F, 5'-GCAAGCTTCAGGATCTACAATCTCGC-3' (SEQ ID NO. 2); QK-R, 5'-CGTCTAGAT-TAAACGACGGGTTGACGA-3' (SEQ ID NO. 3); HK-F, 5'-CGTCTAGAGTATACGTCACGCGCCATCGACC-3' (SEQ ID NO. 4); HK-R, 5'-CGGGATCCGGAGAAAGAC-CATCTCCCC-3' (SEQ ID NO. 5). The obtained two PCR products were ligated at both sides of AphII and Blmt antibiotic resistance genes (1.67 kb) to create an epoK gene fragment containing the antibiotic resistance genes. Said fragment was then ligated to a conjugative transfer vector (pUC18-oriT, Beijing Beijinyuan Technology Co., Ltd.) to obtain the pBGS2-4 conjugative transfer plasmid (the fragments at both sides of Blmt and AphII shown in gray in FIG. 5 are the homologous DNA sequences of epoK).

By the conjugative transfer method, the constructed pBGS2-4 conjugative transfer plasmid was introduced into the *Sorangium cellulosum* So ce90 bacteria using *E. coli* S17-1. Next, phleomycin-resistant colonies were picked on the S42 solid medium containing 30 ug/ml phleomycin. The S42 medium contains 0.05% tryptone, 0.15% $MgSO_4 \cdot 7H_2O$, 1.2% HEPES (PH=7.4) and 1.2% agar. After autoclavtion, 10 ml of filter-sterilized 10% $CaCl_2 \cdot 2H_2O$, 1 ml of 6% $K_2HPO_4$, 1 ml of EDTA-Fe/sodium bisulfite solution, 8 ml of filter-sterilized 40% glucose, 10 ml of 5% ammonium sulfate and 35 ml of autoclaved medium were added for per liter of the S42 medium. About 500 phleomycin-resistant colonies were picked, and their DNA contents were prepared for PCR amplification using primers BG-K1: 5-AT-CATATGACACAGGAGCAAGCGAATCAGAGT-3' (SEQ ID NO. 6) and BK-R: 5-GAGTTC-TACCGGCAGTGCAAATC-3' (SEQ ID NO. 7). The amplification product of about 0.59 kb indicated that the colonies were epoK inactivated, in contrast to that no amplification products indicated the colonies were not inactivated.

Figure 1:
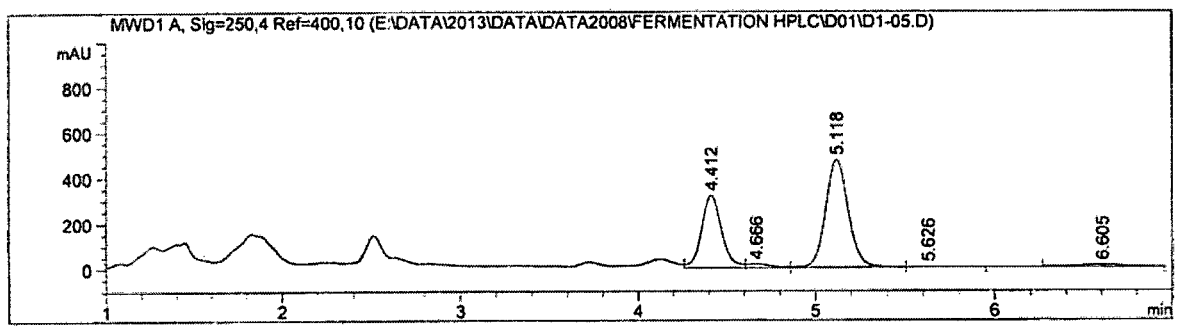
FIG. 1 shows the HPLC profile of the product obtained from the fermentation of the strain BG03-09K, in which de-epoxidized epothilone A is at around 4.4 mins, and de-epoxidized epothilone B is at around 5.1 mins. (Analytical method: 65% acetonitrile: 0.1% glacial acetic acid, isocratic).

The recombinant strains of *Sorangium cellulosum* with epoK inactivation were inoculated in 5 ml BCF medium for seed culture (0.8-1.0% soy peptone, 0.5-0.7% fructose, 0.05%-0.1% $MgSO_4 \cdot 7H_2O$ and 25-50 mM HEPES, pH 7.2-7.6) in glass tubes. The strains were cultured at 34° C. and 200 rpm on shaker for 4 days, and then inoculated into 50 ml FBCF medium (0.6-0.7% soy peptone, 0.5-0.7% fructose, 0.05-0.1% $MgSO_4 \cdot 7H_2O$ and 5-10 mg/L of trace element solution, pH 7.1±0.3, with 2-5% XAD-16 (Rohm & Haas) resin added) and cultured for 7 days. XAD-16 resin was collected from the culture and epothilone metabolites were eluted from XAD-16 using 10 ml methanol. The fermentation products were analyzed by HPLC, and a recombinant strain was obtained and named BG03-09K, which is able to produce de-epoxidized epothilone B. This strain produces de-epoxidized epothilone A/B as the main metabolite while it does not produce epothilone A/B (FIG. 1).

Example 2. BG03-09K Strain's Performance after Storage

An appropriate amount of BG03-09K culture was spread on a S42 agar plate and cultured at 32° C. for 8 days. Colonies were then picked from the plate, inoculated in 3 ml sterile BCF medium in tubes, and incubated on a shaker for 4 days at 34° C. and 200 rpm. One of the tubes with vigorous growth was selected and detected under the microscope for other bacteria. The bacteria in said tube were then transferred to 50 ml BCF medium in 250 ml conical flask and cultured for another three days. The bacteria were checked under the microscope for other bacteria. An appropriate amount of said bacteria in BCF medium was mixed with 90% glycerol in a sterile bottle and aliquoted in 1-1.5 ml in labeled sterile cryopreservation tubes, which were immediately stored at ultra-low temperature below −70° C.

Figure 2A:
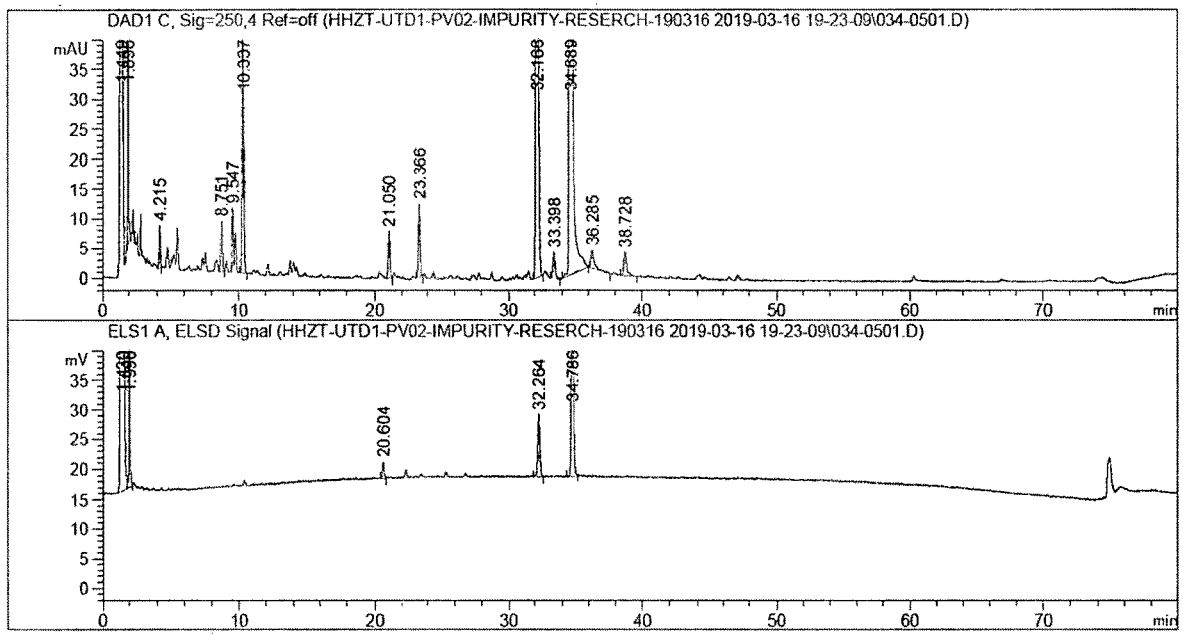
FIG. 2. A shows the analysis and comparison of de-epoxidized epothilone B yield (between 410 mg/L and 480 mg/L) and impurities of the BG03-09K strains before and after passages, in which de-epoxidized epothilone A is at around 32 mins, and de-epoxidized epothilone B is at around 34 mins.

The BG03-09K strain stored at ultra-low temperature below −70° C. for a long time and its passages were investigated for stability. The reproduction cycle of *Sorangium cellulosum* is about 16 hours. Therefore, the fermentation culture was performed using a batched injection approach. At the end of the 14 day fermentation in 100 L volume, the bacteria from the cryopreservation tube have passaged up to 35 generations. At the end of 30 days of continuous passages in 30 ml BCF medium (transferred once a day), the bacteria from the cryopreservation tube have passaged up to 45 generations. Comparisons of these two groups of bacteria and those in the cryopreservation tube showed that, all these bacteria had comparable de-epoxidized epothilone B yield (410 mg/L to 480 mg/L), impurity contents (FIG. 2A, the analysis method is the same as that in Example 4) and the bacteria morphology features (FIG. 2B), indicating that the BG03-09K strains has excellent stability during the passages or long-term storage.

DNA contents were extracted from the original stock of the BG03-09K strain that had been cryopreserved at ultra-low temperature for more than 1 year as well as the above-mentioned two groups of bacteria after serial passages (35 and 45 generations), respectively, digested with NotI and run on 0.8% agar gel. The DNA bands on the gel were then transferred onto a charged nylon membrane according to standard protocols. Molecular hybridization (Southern blot analysis) was performed on the blot with labeled probes for the epothilone biosynthetic gene cluster, and the results showed that all the samples had the same pattern of DNA fragments, indicating that said BG03-09K strain is relatively stable in terms of genetic performance and product yield after storage at ultra-low temperature below −70° C. or continuous passages of 35 or more generations. This means that the strain will not undergo reverse mutation during the storage and fermentation production, which ensures the bacterial consistency during industrial production.

Example 3. Genetic Identification of the BG03-09K Strain

The bacterial cells were obtained from BG03-09K culture (10 mL) via centrifugation, then the cell pellet was immediately resuspended in 3 mL of STE (25% sucrose, 10 mM Tris pH 8, 1 mM EDTA), followed by the addition of 0.6 mL of RLM (5% SDS, 0.5 M Tris pH 7.4, 125 mM EDTA). DNA contents were extracted and served as the template for PCR amplification using Oligo primers, and the PCR products were sequenced and analyzed as described in the following.

4.1 DNA Sequence Analysis of the Inactivation Region of epoK Gene

PCR amplification was performed using the DNA contents from BG03-09K and BG-K1 and BG-K2 as primers, and the amplified fragment of about 2.8 kb was sequenced, confirming that the epoK gene was inactivated due to DNA insertion.

```
BG-K1:
                                    (SEQ ID NO. 6)
ATCATATGACACAGGAGCAAGCGAATCAGAGT-3'

BG-K2:
                                    (SEQ ID NO. 8)
CGCCTCGAGGCGAGCAAGGGACACCCCGGGG-3'
```

The sequencing result is shown in FIG. 3. It was confirmed that the EpoK gene of BG03-09K strain has an insertion of 1.67 kb at position 342, inactivating said gene. The sequence of epoK in BG03-09K was compared to the sequence of epoK in wild-type *Sorangium cellulosum* so ce90 in the database, showing no difference therebetween, i.e. the homology was 100%. This indicated that BG03-09K have no other mutations on the epoK gene except for the insertion that causes inactivation.

4.2 PCR Amplification and Sequencing Analysis of the Housekeeping Gene in BG03-09K Strain The 16S rRNA gene, the methyltransferase (MT domain) gene in the epothilone biosynthetic gene cluster and the glyceraldehyde 3-phosphate dehydrogenase gene were chosen as targets for the strain's genetic identification. Three pairs of oligo primers were designed for PCR amplification, and the obtained PCR products were sequenced and analyzed.

4.2.1 the Universal Primers for the Bacterial 16S rRNA Gene, Namely 27F and 1495R, Were Used for PCR Amplification.

```
27F:
                                    (SEQ ID NO. 9)
5'-AGAGTTTGATCCTGGCTCAG 3'

1495R:
                                    (SEQ ID NO. 10)
5'-CTACGGCTACCTTGTTACGA-3'
```

Results: The amplification product (1.45 kb) was sequenced. The results showed that the 16SrRNA gene sequence of BG03-09K strain was as follows:

```
                                    (SEQ ID NO. 11)
CGGCGCGCTTAACACATGCAAGTCGAGCGAGAAAGGGCTT

CGGCCCCGGTAAAGCGGCGCACGGGTGAGTAACACGTAGG

TAATCTGCCCCCAGGTGGTGGATAACGTTCCGAAAGGAGC

GCTAATACAGCATGAGACCACGTCTTCGAAAGAGGATGAG

GTCAAAGCCGGCCTCTTCACGAAAGCTGGCGCCAGGGGAT

GAGCCTGCGGCCCATCAGCTAGTTGGTAGGGTAATGGCCT

ACCAAGGCGAAGACGGGTAGCTGGTCTGAGAGGATGATCA

GCCACACTGGAACTGAGACACGGTCCAGACTCCTACGGGA

GGCAGCAGTGGGGAATCTTGCGCAATGGGCGAAAGCCTGA

CGCAGCGACGCCGCGTGAGTGATGAAGGCCTTCGGGTTGT

AAAGCTCTGTGGAGGGGACGAATAAGGGTTGGCTAACAT

CCAGCTCGATGACGGTACCCCTTTAGCAAGCACCGGCTAA

CTCTGTGCCAGCAGCCGCGGTAAGACAGAGGGTGCAAACG

TTGTTCGGAATTACTGGGCGTAAAGCGCGTGTAGGCGGTT

CGTAAAGTCAGATGTGAAAGCCCTGGGCTTAACCCAGGAA

GTGCACTTGAAACTCACGAACTTGAGTCCCGGAGAGGAAG

GCGGAATTCTCGGTGTAGAGGTGAAATTCGTAGATATCGA

GAGGAACATCGGTGGCGAAGGCGGCCTTCTGGACGGTGAC

TGACGCTGAGACGCGAAAGCGTGGGGAGCAAACAGGATTA

GATACCCTGGTAGTCCACGCCGTAAACGATGGGTGCTAGG

TGTCGCGGGCTTTGACTCCTGCGGTGCCGTAGCTAACGCA

TTAAGCACCCCGCCTGGGGAGTACGGCCGCAAGGCTAAAA

CTCAAAGGAATTGACGGGGGCCCGCACAAGCGGTGGAGCA

TGTGGTTCAATTCGACGCAACGCGCAGAACCTTACCTGGG

CTAGAAAATGCAGGAACCTGGTTGAAAGATCGGGGTGCTC

TTCGGAGAACCTGTAGTTAGGTGCTGCATGGCTGTCGTCA

GCTCGTGTCGTGAGATGTTGGGTTAAGTCCCGCAACGAGC

GCAACCCCTATCGTTAGTTGCCAGCGGTTCGGCCGGGCAC

TCTAGCGAGACTGCCGATATTTAAATCGGAGGAAGGTGGG

GATGACGTCAAGTCCTCATGGCCCTTATGTCCAGGGCTAC

ACACGTGCTACAATGGGCGGTACAGACGGTCGCGAACCCG

CGAGGGGAAGCCAATCCGAAAAAACCGTCCTCAGTACGGA

TAAGAGTCTGCAACTCGACTCTTTGAAGTTGGAATCGCTA

GTAATCCCTGATCAGCAGGCAGGGGTGAATACGTTCCCGG

GCCTTGTACACACCGCCCGTCACACCATGGGAGTCGATTG

CTCCAGAAGTGGCTGCGCCAACCCGCAAGGGAGGCAGGCC

CCCAAGGAGTG
```

Based on the comparison between said 16S rRNA gene sequence of BG03-09K and the sequences in the database, we found that the evolutionary distance between the 16S rRNA gene sequence of BG03-09K and the sequences of other *Sorangium cellulosum* was less than 1% at nucleotide level, indicating that BG03-09K is a strain of *Sorangium cellulosum*.

4.2.2 Methyltransferase (MT Domain) Fragment in the Epothilone Biosynthesis Gene epoD:

The primers used for PCR amplification were below.

MTW-F:
(SEQ ID NO. 12)
5'-GCTGCTCACCACGCCGGAAT-3'

MTW-R:
(SEQ ID NO. 13)
5'-TCAGCGGAGCCATCGGCCC-3'

Results: The amplified DNA product (1.22 kb) were sequenced, and the results showed that the functional gene sequence of methyltransferase (MT domain) of BG03-09K strain was as follows.

(SEQ ID NO. 14)
TCGGAGGCGGCTGACGGATCTCCACGAACCGGATCTCCCG

CGGTCCAGGGCTCCGGTGAATCAAGCGGTGAGTGACACCT

GGCTGTGGGACGCCGCGCTGGACGGTGGACGGCGCCAGAG

CGCGAGCGTGCCCGTCGACCTGGTGCTCGGCAGCTTCCAT

GCGAAGTGGGAGGTCATGGAGCGCCTCGCGCAGGCGTACA

TCATCGGCACTCTCCGCATATGGAACGTCTTCTGCGCTGC

TGGAGAGCGTCACACGATAGACGAGTTGCTCGTCAGGCTT

CAAATCTCTGTCGTCTACAGGAAGGTCATCAAGCGATGGA

TGGAACACCTTGTCGCGATCGGCATCCTTGTAGGGGACGG

AGAGCATTTTGTGAGCTCTCAGCCGCTGCCGGAGCCTGAT

TTGGCGGCGGTGCTCGAGGAGGCCGGGAGGGTGTTCGCCG

ACCTCCCAGTCCTATTTGAGTGGTGCAAGTTTGCCGGGGA

ACGGCTCGCGGACGTATTGACCGGTAAGACGCTCGCGCTC

GAGATCCTCTTCCCTGGTGGCTCGTTCGATATGGCGGAGC

GAATCTATCGAGATTCGCCCATCGCCCGTTACTCGAACGG

CATCGTGCGCGGTGTCGTCGAGTCGGCGGCGCGGGTGGTA

GCACCGTCGGGAATGTTCAGCATCTTGGAGATCGGAGCAG

GGACGGGCGCGACCACCGCCGCCGTCCTCCCGGTGTTGCT

GCCTGACCGGACGGAGTACCATTTCACCGATGTTTCTCCG

CTCTTCCTTGCTCGCGCGGAGCAAAGATTTCGAGATTATC

CATTCCTGAAGTATGGCATTCTGGATGTCGACCAGGAGCC

AGCTGGCCAGGGATACGCACATCAGAGGTTTGACGTCATC

GTCGCGGCCAATGTCATCCATGCGACCCGCGATATAAGAG

CCACGGCGAAGCGTCTCCTGTCGTTGCTCGCGCCCGGAGG

CCTTCTGGTGCTGGTCGAGGGCACAGGGCATCCGATCTGG

TTCGATATCACCACGGGATTGATTGAGGGGTGGCAGAAGT

ACGAAGATGATCTTCGTATCGACCATCCGCTCCTGCCTGC

TCGGACCTGGTGTGACGTCCTGCGCCGGGTAGGCTTTGCG

GACGCCGTGAGTCTGCCAGGCGACGGATCTCCGGCGGGGA

TCCTCGGACAGCACGTGATCCTCTCGCGCGCGCCGGGCAT

AGCAGGAGCCGCT

Said sequence of the methyltransferase (MT domain) in the epothilone biosynthesis gene epoD gene in BG03-09K was compared to the corresponding sequence in the wild-type *Sorangium cellulosum* so ce90 in the database, showing no difference, i.e. the homology was 100%/. This indicated that BG03-09K and *Sorangium cellulosum* so ce90 belong to the same species, and both of them produce epothilone.

4.2.3 Glyceraldehyde 3-Phosphate Dehydrogenase Gene Fragment

The primers used for PCR amplification were below.

GAPDH-F:
(SEQ ID NO. 15)
5'-TCGTGCTCGAGTGCAC-3'

GAPDH-R:
(SEQ ID NO. 16)
5'-AGAAGCCCCACTCGTT-3'

Results: The amplification product (0.7 kb) was sequenced, and the results are shown below.

The Fragment of GAPDH Gene:

(SEQ ID NO. 17)
AGAAGCCCCACTCGTTGTCGTACCACGAGAAGATCTTCGC

GAAGCGGTCGCCGAGGACCGACGTCATGGTGGCGTCGAAC

GTGCTGGAGGCCGGCGAGCCGATGAAGTCGCCCGAGACGA

GCTCCCGGTCGGTGTAGTCGAGGATGTCCTTCATCGGACC

CTGCTCGGCGGCCTGCTTCATCGCGGCGTTGATGCTGTCC

TTCGTGATCGGCTTCTCGGTCTCGAGGGTGAGGTCCACGA

GCGAGACGTCGACCGTGGGGACGCGGATCGCGAGCCCGTC

GAACTTGCCCTTGAGCGACGGGATGACCTCGGACAGCGCC

TTCGCGGCGCCGGTGCTCGAGGGGATCATGTTGACCGCGG

CGGCGCGCGCGCGGCGCAGGTCGCCCTTCCGGTGCGGGAT

GTCGAGCAGGTGCTGGTCGTTCGTGTACGAGTGCACCGTC

GTCATCAGGCCGCGGACGATGCCGAAGTTGTCGAGCATCA

CCTTGGCGATGGGGCGAGGCAGTTCGTCGTGCAGGAGCC

GCACGAGATGATCGTGTGCTTCTGCGCGTCGTAGAGCTCG

TCGTTCACGCCCATGACGACCGTGAGGTCGTGGCCCTTGG

CGGGCGCGCTGATGATCACGCGCTTGGCGCCGGCGTTCAG

GTGGCCGGCGGCCTTCGCCTTGTCCGTGAAGAGGCCCGTG

CACTCGAGCACGA

Glyceraldehyde 3-phosphate dehydrogenase (GAPDH) is an enzyme that catalyzes the phosphorylation and oxidation of glyceraldehyde 3-phosphate in the presence of NAD+ and phosphoric acid to form 1.3-bisphosphoglycerate during microbial glycolysis. A fragment of the GAPDH gene in BG03-09K was compared with the sequences in the database (there is no corresponding data of So ce90 strain in the database). It was found that the evolutionary distance between said fragment and the corresponding sequence in *Sorangium cellulosum* so0157-2 or *Sorangium cellulosum* so ce56 was 1.7% or 3.0, respectively, indicating that BG03-09K and *Sorangium cellulosum* so ce56 belong to the same species.

4.3 Physicochemical Properties and Morphological Identification of the BG03-09K Strain The BG03-09K strain of *Sorangium cellulosum* can grow using cellulose as the sole carbon source and potassium nitrate ($KNO_3$) as the sole nitrogen source. On a filter paper with ST2 inorganic salt agar medium (0.1% $KNO_3$, 0.1% $MgSO_4 \cdot 7H_2O$, 0.1% $CaCl_2 \cdot 2H_2O$, 0.1% $K_2HPO_4$, 0.01% $MnSO_4 \cdot 7H_2O$, 0.02% $FeCl_3$, 0.002% yeast extract, trace element solution (Beijing Beijinyuan Technology Co., Ltd.), 1% agar), the BG03-09K strain formed fruit bodies colored from dark russet to dark brown. The vegetative mycelium of this strain during the logarithmic growth phase in liquid culture was rod-shaped, and dark cylindrical bacilli with wide rounded ends were visible under phase contrast microscope, with an average length of 3-6 μm and a thickness of 1 μm. These cells, however, were easy to aggregate to form sunflower clusters after 10 minutes, especially during the late liquid culture stage or the early stage of fermentative production.

Example 4. Production of De-Epoxidized Epothilone B Using Genetically Recombined Strain *Sorangium cellulosum* BG03-09K Step 1. Strain Recovery and Shake Flask Culture Stock bacteria in one or two cryopreservation tubes were thawed at room temperature and aseptically inoculated in 50 ml BCF2 recovery medium (3 g/L glucose, 3 g/L fructose, 5 g/L yeast powder, 4 g/L peptone, 0.5 g/L $MgSO_4 \cdot 7H_2O$, pH 7.4), and cultured on shaker at 34° C. 1° C. for 4±1 days. According visual inspection, the bacterial medium should be foggy and the bacterial cells have not aggregated to form a large number of spherical particles. The bacteria meeting these requirements were aseptically inoculated in about 500 ml BCF culture medium in a conical flask, and were then cultured at 34° C. 1° C. for 3±1 days. According to visual inspection, the bacterial broth should be foggy, and the bacterial cells have not aggregated to form a large number of spherical particles, and there was no bacterial contamination.

Step 2. Cultivation in Primary Seed Tank

The strain cultures in the flask were then aseptically inoculated in 5 L sterile BCF medium for seed culture (0.8-1.0% soy peptone, 0.5-0.7% fructose, 0.05%-0.1% $MgSO_4 \cdot 7H_2O$) in a primary seed tank, and cultured for 3±1 days under the following conditions.

The primary seed culture parameters: culture temperature 34±1° C., PH adjusted to 7.1±0.3 with acid and base, and dissolved oxygen control point of 30%, controlled by air inflow volume and stirring speed. Anti-foaming agent was used.

Step 3. Fermentation Culture

The seed medium in the primary seed tank was aseptically subcultivated in 90 L aseptic FBCF medium in a fermentation tank at an inoculation ratio of 5±1%, and cultured for 14±2 days according to the following process parameters before the fermentation culture ended. The fed-batch process was performed 2±1 times per day during the fermentation, starting from day 3±1, with soy peptone solution and fructose solution added every time. From day 6 of fermentation to the end of the day (12-16 days), sampling was performed daily to detect the contents of de-epoxidized epothilone B as well as the bacterial contamination. The fermentation yield was >300 mg/L.

Fermentation culture parameters: culture temperature 34±1° C., pH 7.1±0.3, adjusted with acid and base, DO control point of 30%, controlled by air inflow volume and stirring speed, and anti-foaming agent was used.

The FBCF medium used for fermentation production contains: 0.6-0.7% soy peptone, 0.5-0.7% fructose, 0.05-0.1% $MgSO_4 \cdot 7H_2O$, 5-10 mg/L trace element solution (Beijing Beijinyuan Technology Co., Ltd.), with 2-5% XAD resin added.

Figure 4A:
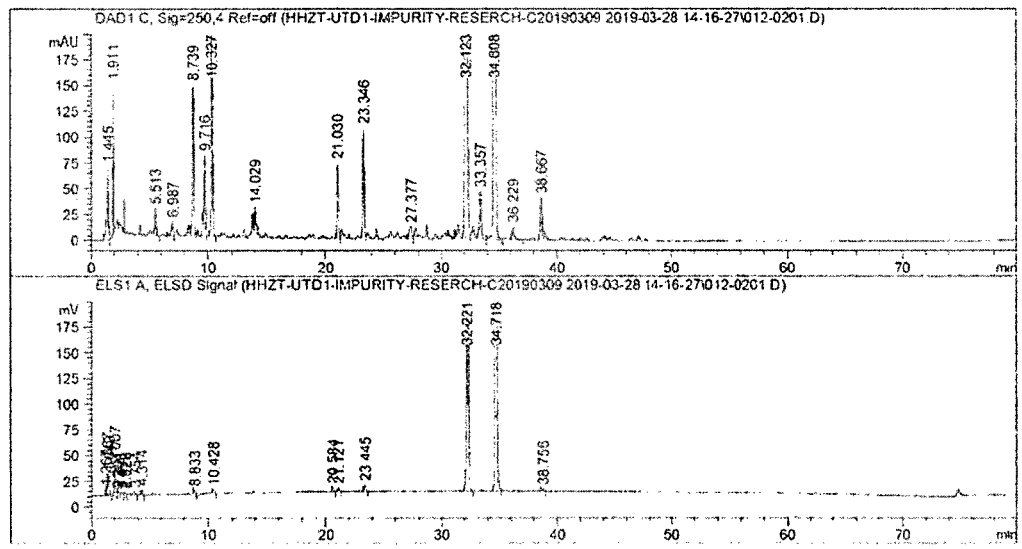

To measure the fermentation yield, the fermentation medium was sampled and tested by HPLC using XAD resin and a methanol elution solution. The HPLC analysis spectrum is shown in FIG. 4A, according to the following analysis method.

ELSD-LC analytical method: HPLC gradient method, DAD combined with ELSD detection 1.1) Chromatography Conditions Liquid phase chromatography: Agilent Model 1260 HPLC Mobile phase A: 0.1% glacial acetic acid Mobile phase B: acetonitrile Flow rate: 1.0 ml/min Elution Gradient

| Time | Mobile Phase A | Mobile Phase B |
| --- | --- | --- |
| 0 minutes | 80% | 20% |
| 60 minutes | 0% | 100% |
| 70 minutes | 0% | 100% |
| 75 minutes | 80% | 20% |
| 80 minutes | 80% | 20% |

Chromatography column: Agilent ZORBAX Eclipse Plus C18 4.6*150 mm, 5 μm

Column temperature: 35° C.

Detector A: Agilent DAD detector, scanning at 190 nm-400 nm

Detector B: Agilent ELSD detector, the evaporation tube and drift tube's temperature: 50° C.; carrier gas's flow rate 1.8 L/min.

Step 4: Fermentation Resin Harvest and Elution

After the fermentation was completed, the XAD resin was separated from the bacterial cells/bacterial culture with a sieve. After the XAD resin in the fermentation medium was intercepted by a 100-mesh sieve and rinsed, it was loaded onto XAD resin column to elute the XAD resin using methanol, and the methanol elution was collected as the XAD eluate. After the XAD elution was completed, it was tested by HPLC.

Step 5: PC Column Pre-Treatment

The XAD eluate was passed through an absorbent cotton filter, and water was added to prepare a sample solution with a methanol concentration of about 45% (v/v), which was then loaded onto a PC chromatographic column (C18 packing), followed by an isocratic/gradient elution with a 62-80% methanol solution. The product fractions were collected and analyzed by HPLC for its content.

Step 6: C Column Separation and Purification

Figure 4B:
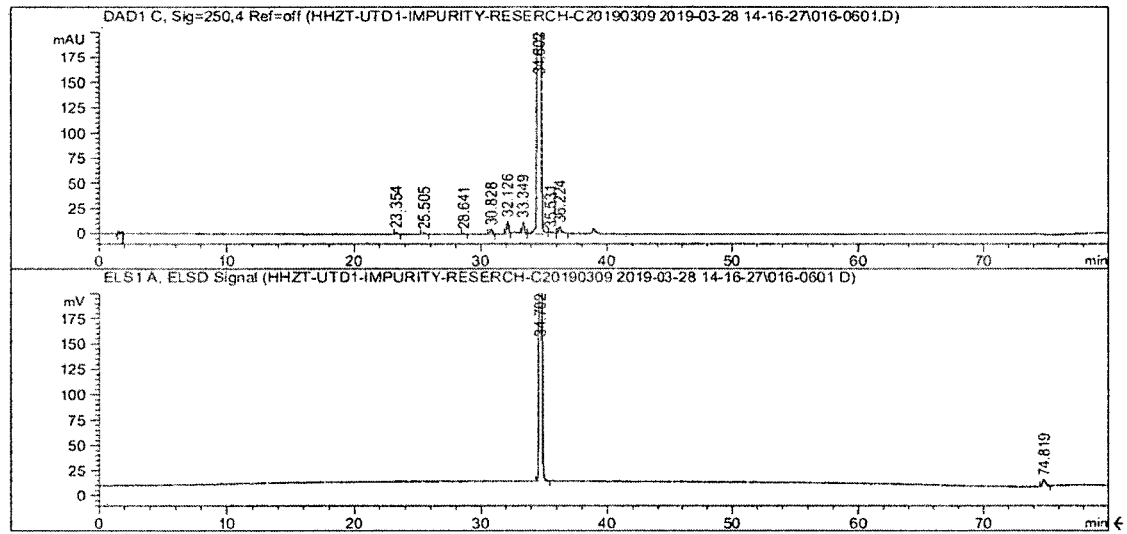

The collected fractions that met the standards from the above PC column treatment were added into water to prepare a sample solution with a methanol concentration of about 50% (v/v). Said sample solution was then loaded onto a C chromatographic column (C18 packing), followed by isocratic/gradient elution with a 62-80% methanol solution and collection of product fractions. The HPLC purity of de-epoxidized epothilone B in the collected fractions that meet the standards from the PC column treatment reached 98%, and the peak area of other individual impurities was no more than 1.0%, as shown in FIG. 4B below.

A higher yield was obtained by extending the fermentation time to 14±2 days using the batched injection approach. With this fermentation process, the de-epoxidized epothilone yield of BG03-09K in the fermentation tank was up to 500 mg/L. After treatment with PC column and C column, the HPLC purity of the collected product reached to 98% or more.

Although the present invention has been disclosed with reference to certain embodiments, it will be evident that modifications and changes may be made without departing from the spirit and scope of the invention as disclosed herein and as provided in the appended claims. Furthermore, it is to be understood that all the examples herein, while an illustration of the invention, are provided as non-limiting examples only and will therefore not to be considered limiting to the various aspects of the invention thus illustrated. The invention is intended to encompass the full range defined by the present disclosure, the language of the following claims, and any equivalents thereof. Accordingly, the drawings and detailed description are to be regarded in an illustrative rather than a restrictive sense.

The invention claimed is:

1. A recombinant strain of *Sorangium cellulosum* for producing de-epoxidized epothilone B via fermentation, in which a cytochrome P450 epoxidase (epoK) gene in an epothilone biosynthesis gene cluster is inactivated, wherein the epoK gene is inactivated by insertion, wherein the inactivated epoK gene comprises the nucleotide sequence of SEQ ID NO:1, and wherein the insertion sequence is from position 291 to position 1960 of SEQ ID NO:1.

2. The recombinant strain according to claim 1, which wherein the recombinant strain is derived from *Sorangium cellulosum* So ce90.

3. The recombinant strain according to claim 1, which is a high-yield strain with that produces the de-epoxidized epothilone B as a main product.

4. A method for producing de-epoxidized epothilone B, comprising culturing in a medium the recombinant strain of claim 1.

5. The method according to claim 4, wherein the medium is a water-soluble medium, such as BCF medium for seed culture, which contains 0.8-1.0% soy peptone, 0.5-0.7% fructose, 0.05%-0.1% $MgSO_4 \cdot 7H_2O$ and 25-50 mM HEPES, pH 7.2-7.6, and FBCF medium for fermentation production, which contains 0.6-0.7% soy peptone, 0.5-0.7% fructose, 0.05-0.1% $MgSO_4 \cdot 7H_2O$ and 5-10 mg/L trace element solution, pH 7.1±0.3.

6. The method according to claim 4, comprising adding XAD-16 resin into a fermentation medium for fermentation.

7. The method according to claim 4, wherein fed-batch is performed daily during the fermentation.

8. The method according to claim 4, further comprising purifying de-epoxidized epothilone B with a PC chromatographic column and a C chromatographic column.

9. The method according to claim 4, wherein the recombinant strain is derived from *Sorangium cellulosum* So ce90.

10. The method according to claim 4, wherein the recombinant strain produces the de-epoxidized epothilone B as a main product.

11. The method according to claim 8, wherein said purifying comprises eluting the PC chromatographic column or the C chromatographic column with a solution of 62-80% methanol.

12. The method according to claim 6, wherein 2%-5% XAD-16 resin is added into the into the fermentation medium for fermentation.

* * * * *